J. C. BLACK
July 18, 1933. PROCESS OF CRACKING OIL Re. 18,896
Original Filed Oct. 20, 1926
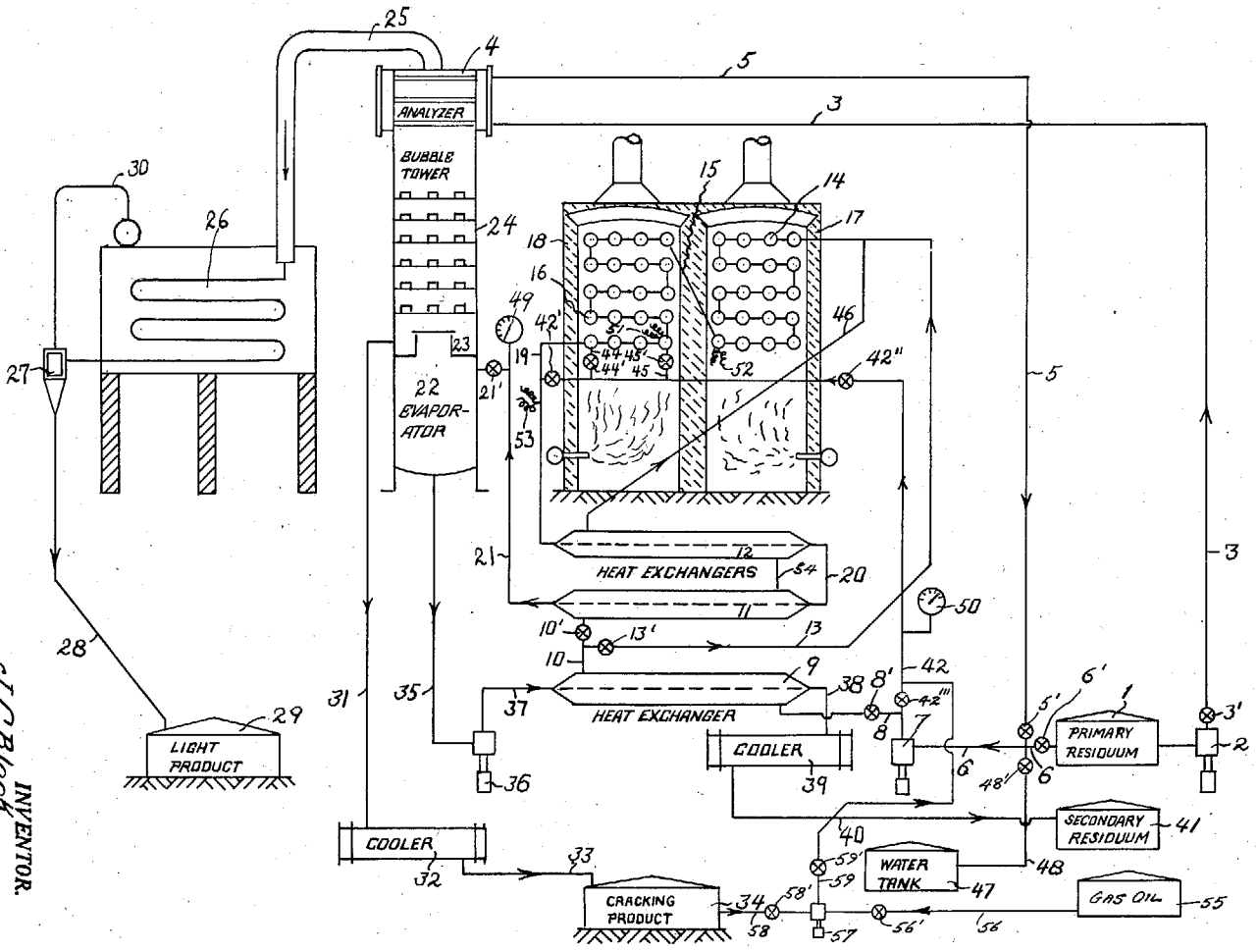
INVENTOR.
J. C. Black
BY L. N. Dillis
ATTORNEYS.

Reissued July 18, 1933 Re. 18,896

UNITED STATES PATENT OFFICE

JOHN C. BLACK, OF WILMINGTON, CALIFORNIA, ASSIGNOR TO GASOLINE PRODUCTS COMPANY, INC., OF JERSEY CITY, NEW JERSEY, A CORPORATION OF DELAWARE

PROCESS OF CRACKING OIL

Original No. 1,715,980, dated June 4, 1929, Serial No. 142,997, filed October 20, 1926. Application for reissue filed May 22, 1931. Serial No. 539,374.

It is well known that oils may be decomposed if they are heated at an elevated temperature, and that these oils must be heated above a minimum low temperature in order to obtain any appreciable decomposition of the oil. It is also known that above this minimum temperature the rate of the cracking reaction is augmented with the rise of temperature. Oils of low specific gravity are less easily cracked and require a higher temperature than oils of high specific gravity.

I have found that in cracking an oil the higher the temperature the more rapid the rate of production of carbon which is formed in the cracking reaction. Thus the amount of carbon which will be formed per unit of time increases with increasing temperature and this increase is not linearly proportional to the temperature but increases more rapidly than the temperature, that is as other than the first power of the temperature. Thus, in cracking an oil an increase of temperature from 800° F. to 850° F. causes an increased carbonization over an oil heated to 800° F., and this increase is considerably less than the increase caused by changing the cracking temperature from 850° F. to 900°F., and the latter is less than the increase caused by changing the cracking temperature from 900° F. to 950° F.

This characteristic is more pronounced in the cracking of a heavy oil such as a fuel oil, than in the cracking of a lighter oil such as a gas oil. In a heavy oil the amount of carbon deposition which occurs where the oil is heated to its lowest practical cracking temperature is considerably more than that occurring when the gas oil is heated to its practical cracking temperature, even though the point at which decomposition sets in in a fuel oil is considerably less than that at which decomposition in the cracking of a gas oil sets in. Another important consideration resides in the fact that in order to get a formation of substantial amounts of gasoline from a fuel oil, the temperature to which the fuel oil must be heated is not substantially less than that to which the gas oil must be heated. I have found that unless this be done the fuel oil will decompose to form gas oil with relatively small amounts of gasoline. Therefore, in order to produce gasoline from fuel oil the temperature must be sufficiently high to decompose considerable portions of the gas oil formed by the cracking of the fuel oil. However, if this be done excessive carbonization will occur.

For example, in operating a well known cracking process in which fuel oil is cracked by passing the oil through a tube under pressure, then in an evaporating chamber under pressure and in which lighter bodies are distilled, it is the usual practice to heat the fuel oil in the neighborhood of 900° F. Under these conditions 10% of the charge is precipitated as carbon and the residuum withdrawn from the evaporator contains as much as 5% of carbon.

I find that a fuel oil may be cracked economically and efficiently without the formation of material amounts of carbon by avoiding the excessive temperatures usually employed in cracking fuel oil to form gasoline. I operate below the cracking temperatures employed in cracking gas oil. That is below approximately 800° F.

I have found that each oil has a characteristic temperature at which it will crack without the formation of excessive amounts of carbon. If the temperature be raised beyond this point, while there is an increase in the decomposition, there is also an excessive formation of carbon. If the temperature be decreased below this point, while the decrease in the amount of carbon formed is unappreciable, the decomposition falls off very materially. This point is easily determined for each oil by heating the oil under desired pressure to different temperatures for the length of time chosen to produce desirable decomposition. This point will be called throughout this specification as the "temperature of excessive carbonization". I have also found that when operating at the temperature above specified, that carbenes instead of fixed carbon are formed. These carbenes are soluble in the oil and if sufficient pressure is maintained on the oil to prevent substantial vaporization during cracking, they will not precipitate.

I have found that by maintaining the oil at this cracking temperature for a prolonged period of time i. e. below its "temperature of excessive carbonization" I can obtain substantial conversion of the oil. That is by heating the oil at this lower temperature and over a longer period of time I can get the same amount of oil decomposed without carbonization. I get, however, a different type of conversion than is obtained when operating for a short period at a high temperature, as will appear below.

By regulating the temperature of the oil so that it will not exceed this temperature of excessive carbonization, and limiting the conversion of fuel oil to form a cracked product of the nature of gas oil, that is, heavier than gasoline, and by supplying the endothermic heat to the cracking reaction, maintaining this temperature over a considerable period of time, i. e. for a period to cause the desired decomposition, I have been able to convert fuel oil into a lighter product without any material carbonization. The gas oil separated from the cracked product may then be recracked, as is described in my Patent 1,456,419. By thus regulating the cracking and removing the lighter products the remaining residuum will be found not materially different in character from the original stock. I have also found that the cracking of the oil in tubes is materially aided and the carbonization materially reduced by the injection of relatively cool oil into the final passes of the cracking coil. I have found that by the injection of this oil into the final passes, I obtain a greater yield of decomposed hydrocarbons. Also, I have found that the fouling of the tubes is very materially lessened by this injection of oil into the final passes. I have found that I can operate at a higher temperature without causing excessive decomposition, and thus obtain increased yields. I have also found that the injected hydrocarbons are themselves partially decomposed by the heat contained in the hydrocarbons of the main stream into which they are injected, and also by the heating effect derived from the furnaces while passing through the final passes of the reaction coil. By this injection of oil the heat absorptive characteristics of the oil stream is modified and heat may be transferred to the oil stream without excessive carbonization resulting even if a higher temperature is employed.

While I do not limit myself to the theory here advanced, I believe that this theory is a very probable explanation of the phenomena observed. It is apparent that in operating the system according to my former method, without the injection of oil into the final passes, that the oil, reaching the final passes, will have been highly cracked with a large formation of lighter oils which do not crack easily. The oil stream also contains heavy bodies, probably formed as a result of the cracking reaction. The practical oil man says that the oil becomes "dirty." The oil stream and the fire are manipulated so as to maintain the oil at the chosen cracking temperature. Any transfer of heat that results under the above circumstances goes to carbonize the heavy bodies, depositing a dense carbon on the walls of the tubes. The heat conductivity is thus reduced. The tubes become overheated and the result is that as more oil advances the carbonization at the film between the oil and tubes becomes more and more severe. This is aggravated by the fact that in systems involving countercurrent passage of oil and combustion gases in the furnace, the oil in the final passes of the coil comes in contact with the hottest gases.

Another result is that this high temperature cracking which results at the surface of the highly heated tubes causes a formation of a large amount of gas which builds up a high vapor pressure. This pressure, if carried to excess, may exceed the operating pressure employed and cause a serious interference in the operation of the process. The introduction of cold, or relatively cold uncracked oil into the final passes avoids the difficulties mentioned above. The injected oil absorbs heat, in having its sensible heat augmented, from the cracked oil entering the final passes, thereby lowering the temperature of the cracked oil and also checking its cracking. The partially cooled stream then absorbs heat from the combustion gases and the tube wall surface to have its temperature raised to substantially the desired cracking temperature. There is, therefore, under these circumstances, a large transfer of heat from the combustion gases to the oil passing through the final passes of the coil. The uncracked oil in the stream also absorbs heat due to the endothermic character of the cracking reaction. The tubes are kept from overheating and the excessive carbonization as above described is materially reduced.

Furthermore, by the injection of this relatively cold oil, any carbonaceous material deposited in the reaction is of softer composition and is more readily removed in the blowing down operation and the heaters can be put back on stream with a smaller loss of time. The injected oil should be so controlled that the temperature of the admixed streams may be such that the decomposition of the injected oil is partially accomplished and to obtain a temperature of the mixture such that the decomposition in the main stream is checked and the carbon of decomposition is minimized. Another effect caused by the dilution of the oil is that the vapor pressure of the oil is diminished, thus maintaining the oil in the liquid phase.

It is therefore an object of my invention to crack fuel oil at relatively low temperature to prevent material decomposition and to form a cracked product in the nature of a gas oil which will then be capable of being cracked at more elevated temperatures.

It is another object of my invention to crack fuel oil at a relatively low temperature, but over a sufficient length of time to produce material conversion of the heavy oil.

My invention will be better understood by referring to the accompanying drawing which shows the schematic arrangement of one method of carrying out the invention in which:

1 is a tank for holding charging stock. 2 is a pump connecting tank 1 by a line 3 with the analyzer 4 situated in bubble tower 24. 3′ is a valve in line 3. 5 is an exit line connecting analyzer 4 with pump 7. 5′ is a valve in said line. 6 is a line connecting tank 1 with pump 7. 6′ is a valve in said line. 8 is a line connecting pump 7 with heat exchanger 9. 8′ is a valve in said line. 10 is a cross-over line connecting heat exchanger 9 with heat exchanger 11. 10′ is a valve in said line. 54 is a cross-over line connecting heat exchanger 11 with heat exchanger 12. 46 is a line connecting heat exchanger 12 with coils 14 situated in furnace 17. 13 is a by-pass line connecting line 10 with coils 14. 13′ is a valve in said line. 15 is a cross-over line connecting coil 14 with coil 16 situated in furnace 18. 19 is an exit line leading from the exit of coil 16 through heat exchanger 12. 20 is a cross-over line conne ting exchanger 11 with ex changer 12. 21 connects exchanger 11 with evaporator 22. 21′ is a pressure reducing valve in line 21. 23 is a trap in bubble tower 24. 25 is a vapor line connecting bubble tower 24 with condenser 26. 27 is a look-box situated in run-down line 28. 29 is a collecting tank for condensate issuing from 28. 30 is a gas vent leading from look-box 27. 31 is a line for separating the condensate formed in the bubble tower 24. 32 is a cooler for said condensate. 33 is a line connecting the cooler 32 with tank 34. 35 is a line connected to the bottom of evaporator 22. 36 is a pump in said line. 37 is a line connecting the pump 36 with heat exchanger 9. 38 is a line connecting exchanger 9 with cooler 39. 40 is a line connecting cooler 39 with tank 41. 42 is a line connecting pump 7 with line 19. 42′, 42″, 42‴ are valves in said line. 45 is a line connecting line 42 with one of the final passes of the coil 16. 45′ is a valve in said line. 44 is a line connecting line 42 with the final tube of coil 16. 51 is a pyrometer at the point of connection of line 45 with tube 16. 47 is a water tank. 48 is a line connecting said water tank with line 6. 48′ is a valve in said line. 49 is a pressure gauge in line 21 immediately before valve 21′. 50 is a pressure gauge in line 42. 52 is a pyrometer at the exit of coil 14. 53 is a pyrometer in line 19. 54 is the aforementioned cross-over line connecting exchanger 11 with exchanger 12. 55 is a gas oil tank. 56 is a line connecting said gas oil tank with pump 57. 56′ is a valve in said line. 58 is a line connecting tank 34 with pump 57. 58′ is a valve in said line. 59 is a line connecting pump 57 with line 42. 59′ is a valve in said line. The operation of this process will be understood in conection with above apparatus.

A primary residuum contained in tank 1, which may be a crude residuum such as fuel oil, is pumped by pump 7 through line 8 controlled by valve 8′, through the heat exchanger 9 and heat exchangers 11 and 12, and via line 46 through coil 14. In coil 14 the oil is heated to the desired cracking temperature, measured by pyrometer 52. The oil is then passed into coil 16 where this temperature is maintained and the endothermic heat of the cracking reaction supplied. The temperature may, however, be increased in this furnace. I prefer, however, to operate the invention in such a manner as to maintain the temperature of the oil through the coil 16 constant. Instead of raising the oil to the cracking temperature at the point of exit from coils 14, the oil may reach the cracking temperature at some point in coil 14 and the temperature remain substantially constant through the remaining operation of coil 14 and through coil 16. The oil is then passed from coil 16 via line 19 through exchangers 12 and 11, where it is cooled down, thus preheating the incoming oil. The temperature to which the oil is cooled should not be below that required to give the desired evaporation in evaporator 22. If too much cooling is effected some of the oil passing through line 10 is by-passed via line 13 and tubes 14. The oil issuing from exchanger 11 has its pressure reduced at valve 21′ and exits into evaporator 22. The vapors rising from evaporator 22 are refluxed in bubble tower 24. This reflux or fractionation is controlled by regulating the amount of oil passed via pump 2 line 3 through analyzer 4. The oil thus preheated is introduced via line 5 into the main stream entering the intake of pump 7. The lighter fractions which may be the gasoline produced, are condensed in condenser 26 and the condensate passing through look-box 27 collecting via line 28 in tank 29. The gases issuing from look-box 27 are collected via line 30. A portion of the oil issuing from the exit of pump 7 may be passed via line 42 controlled by valves 42′, 42″, and 42‴ into either the final passes of coil 16 or into the final tube of said coil, or into line 19. Instead of using, or in addition to using the primary residuum from tank 1, a gas oil from tank 55 may be pumped via pump 57 into line 42 by the requisite control of valves 42′, 42″, 42‴, valve 56′ and valve 59′. Instead of using gas oil, or in addition to using the gas oil, a cracking product in tank 34 may be pumped via line 58 by the requisite control of the valve 58′ and the other valves mentioned, via pump 57 via line 59 into line 42.

The amount of injected oil is controlled to check the cracking in the final passes and to crack a portion of the injected oil. As a specific example of the method of operating this invention on fuel oil, the following may be given as an illustration:

Fuel oil, as for instance an oil which would meet the specifications for bunker fuel oil "C" given in Technical Paper 323A of the Bureau of Mines, contained in tank 1 is pumped under pressure sufficient to prevent any substantial vaporization in the coils, and is heated in coils 14 to about 800° F. This temperature is maintained in coil 16 to subject the oil to heat at this temperature for a period of about twenty to twenty-five minutes, or more, i. e. for a period sufficient to cause the desired decomposition. The temperature of the oil is modified by the injection of oil in any of the manners described above, for instance, cold oil may be injected via 45 to drop this temperature from 50° F. to 100° F. The oil is then heated up and it passes through the rest of the coil so that its temperature when measured at point 53 shall be 800° F. or lower for example between 750–800° F. Or the oil may be injected directly via 44 or via valve 42′ to drop the temperature of the oil from 800° F. to about 750° F. The oil is then passed through the exchangers 12 and 11, and this temperature reduced to about 550° F. The oil in passing through the coil is maintained under a pressure sufficient to prevent substantial vaporization. In using fuel oil this pressure may be in the neighborhood of 500 pounds measured in the terminal gauge 49. The pressure is reduced to substantially atmospheric and the oil is vaporized in evaporator 22. The vapors rising in bubble tower 24 are refluxed and the reflux controlled by the passage of oil through analyzer 4. Vapors issuing from 25 are gasoline and condensed in 26 and collected in 29. An intermediate fraction is drawn off from 31, cooled in 32 and collected in tank 34. This condensate is an artificial gas oil made by the cracking of the fuel oil. The fuel oil which is the residuum removed from evaporator 22 via pump 36 is cooled down in heat exchanger 9 and cooler 39, and collected in 41, and will be found to be a fuel oil which will also meet the Government specifications for bunker fuel oil "C" specified above. In other words, the cracked product formed during the cracking reaction is removed by this evaporation and refluxing. By limiting the temperature below the point of active carbonization the concentration of the carbon will be such as to be less than 0.25% required by this Government specification. In operating in the above manner it will be found that about 5% of gasoline is formed and about 25% of a gas oil will be separated via line 31.

The oil injected via line 42 may be, as was stated previously, a primary residuum in tank one, or may be a portion of a product collected in tank 34, or may be of the nature of a gas oil in tank 55. By the injection of this oil I have found that the excessive carbonization which sometimes occurs in the final passes of the tube is materially reduced, permitting of the using of slightly higher temperatures than would be possible if this injection were not used. But even by the use of this injection oil the temperature must be limited below the point of active carbonization or excessive carbonization in coil 16 will occur. The injected oil may be cracked by the heat in the main stream of oil. This cracking is aided by the sudden rise in temperature through which the oil is carried at the moment of injection. This effect of the sudden rise in temperature I have termed the "shock" effect.

The above is not to be taken as limiting my invention, but merely as illustrative of the best manner of carrying out my invention, which I claim to be:

1. A process of cracking crude oil residuum for the production of a relatively small amount of low boiling hydrocarbons, a relatively larger amount of higher boiling hydrocarbons, and a residuum suitable for fuel oil, which comprises, passing a crude oil residuum through a series of cracking coils, under super-atmospheric pressure and at a temperature sufficient to lightly crack the same, and preventing further destructive decomposition of the hydrocarbons of said crude oil residuum by the introduction of a cooler hydrocarbon oil into the final passes of the last cracking coil, in quantities sufficient to maintain the said crude oil residuum below the temperature of excessive cracking and carbonization.

2. A process of cracking crude oil residuum for the production of a relatively small amount of low boiling hydrocarbons, a relatively larger amount of higher boiling hydrocarbons, and a residuum suitable for fuel oil, comprising, passing a crude oil residuum through a series of cracking coils, under super-atmospheric pressure and at a temperature sufficient to lightly crack the same, thereby preventing the destructive decomposition of the hydrocarbons to carbonaceous material to any substantial degree; and introducing a cool hydrocarbon oil into the final passes of the last cracking coil, in quantities sufficient to prevent further cracking of the first mentioned oil substantially as described.

3. A process of cracking crude oil residuum for the production of a relatively small amount of low boiling hydrocarbons, a relatively larger amount of higher boiling hydrocarbons, and a residuum suitable for fuel oil, comprising, passing a crude oil residuum through a series of cracking coils, under super-atmospheric pressure and at a temperature sufficient to lightly crack the same, and substantially preventing the destructive decomposition to carbonaceous material of any of said crude oil residuum by the introduction of a cooler hydrocarbon oil into the final pass of the last coil, in quantities sufficient to maintain the said crude oil residuum below the temperature of excessive cracking and carbonization.

4. A process of cracking fuel crude oil for the production of a relatively small amount of gasoline stock, a relatively larger amount of higher boiling oil and a residuum suitable for fuel oil purposes, comprising, passing said crude oil through a series of cracking coils under super-atmospheric pressure at a temperature just sufficient to lightly crack the same, and heating for a prolonged period of time while passing through the cracking coils, and substantially preventing the destructive decomposition to carbonaceous material of said crude oil by the introduction of a cool oil into the final passes of the last cracking coil, in quantities sufficient to maintain the crude oil below the temperature of excessive decomposition, and to lightly crack the said introduced cool oil.

5. A continuous process of cracking fuel oil at relatively low cracking temperatures for the production of a minor portion of low boiling hydrocarbons, a larger portion of relatively higher boiling hydrocarbons, and a residuum suitable for fuel oil, comprising, passing fuel oil through a series of cracking coils under super-atmospheric pressure over a prolonged period of time while passing through the cracking coils, and maintaining a relatively low cracking temperature to crack the same lightly, and substantially preventing the destructive decomposition of carbonaceous material of said fuel oil by the introduction of a cooler oil into the final passes of the last cracking coil, in quantities sufficient to immediately cool the first mentioned oil below the cracking temperature, substantially as described.

6. A continuous process of cracking fuel oil at relatively low cracking temperatures for the production of a minor portion of low boiling hydrocarbons, a larger portion of relatively higher boiling hydrocarbons, and a residuum suitable for fuel oil, which comprises, passing fuel oil through a series of cracking coils under super-atmospheric pressure, at relatively low cracking temperatures to crack the same lightly, and preventing the destructive decomposition to carbonaceous material of substantially any of said fuel oil by the introduction of a cooler fuel oil into the last passes of the final cracking coil, in quantities sufficient to cool the first mentioned oil below the temperature of excessive cracking, vaporizing the lower boiling hydrocarbons together with the relatively higher boiling hydrocarbons produced, fractionally separating the lower boiling hydrocarbons from the higher boiling hydrocarbons, and separately withdrawing an unvaporized residuum suitable for fuel oil.

7. A process of cracking hydrocarbon oil which comprises passing the oil through a final coil section in a heating zone, supplying combustion gases from a single combustion zone to said coil section in such a manner that said gases pass first over the final passes of said coil section and introducing a cooler hydrocarbon oil into the final passes of said coil section which are first heated by the combustion gases and after the oil passing through the coil section has been raised to a cracking temperature, to prevent excessive decomposition and deposition of carbon therein.

8. A process of cracking hydrocarbon oil which comprises passing the oil through a final coil section in a heating zone, supplying combustion gases from a single combustion zone to said coil section in such a manner that said gases pass first over the final passes of said coil section, the direction of flow of the oil through the coil section being countercurrent to the flow of the combustion gases, and introducing a cooler hydrocarbon oil into the final passes of said coil section which are first heated by the combustion gases and after the oil passing through the coil section has been raised to a cracking temperature, to prevent excessive decomposition and deposition of carbon therein.

9. A process of cracking hydrocarbon oil which comprises passing the oil through a final coil section in a heating zone, supplying combustion gases from a single combustion zone to said coil section in such a manner that said gases pass first over the final passes of said coil section, introducing a cooler hydrocarbon oil into the final passes of said coil section which are first heated by the combustion gases and after the oil passing through the coil section has been raised to a cracking temperature, to prevent excessive decomposition and deposition of carbon therein, and discharging the oil from said final coil section to the exterior of the heating zone.

10. A process of cracking hydrocarbon oil which comprises passing the oil through a final coil section in a heating zone, supplying combustion gases from a single combustion zone to said coil section in such a manner that said gases pass first over the final passes of said coil section, introducing a cooler hydrocarbon oil into the final passes of said coil section which are first heated by the combustion gases and after the oil passing through the coil section has been raised to a cracking temperature, to prevent excessive decomposition and deposition of carbon therein, discharging the cracked products from said coil section into a separating zone wherein the cracked products are separated into vapors and non-vaporous residual products, and preventing the return of the said residual products to the oil undergoing cracking in the said coil section.

11. A process of cracking hydrocarbon oil which comprises passing a stream of oil through a final coil section in a heating zone while maintaining the said oil under superatmospheric pressure, supplying combustion gases from a single combustion zone to said coil section to effect the desired conversion of the oil, said gases first passing over the final passes of said coil section introducing a cooler hydrocarbon oil into the final passes of said coil section which are first heated by the combustion gases and after the oil has reached a conversion temperature and while said oil is under said pressure, to prevent excessive decomposition and deposition of carbon, thereafter materially reducing the pressure upon the said stream of oil to a relatively low pressure and discharging it into a separating zone without substantial further conversion wherein the said oil is separated into vapors and non-vaporous residual products, and preventing the return of the said residual products to the oil undergoing conversion.

JOHN C. BLACK.